UNITED STATES PATENT OFFICE.

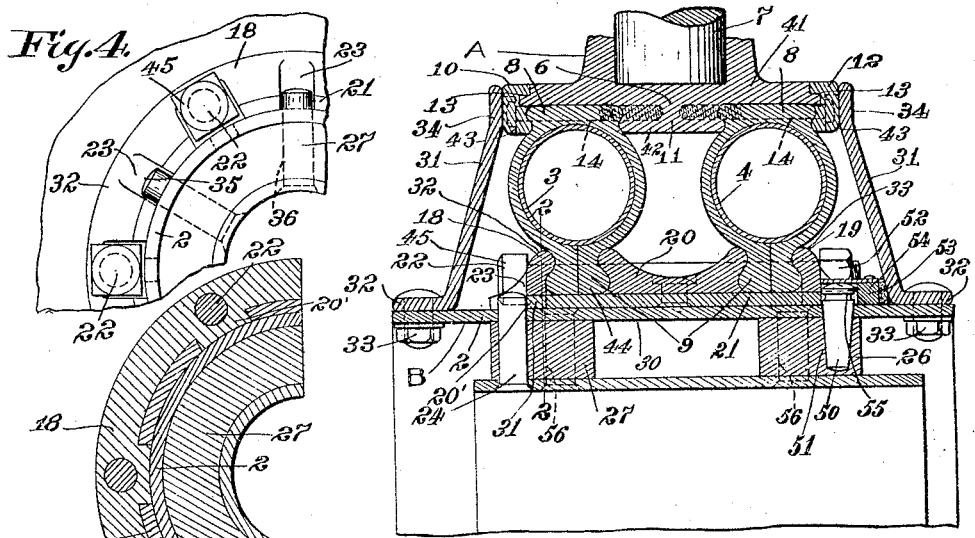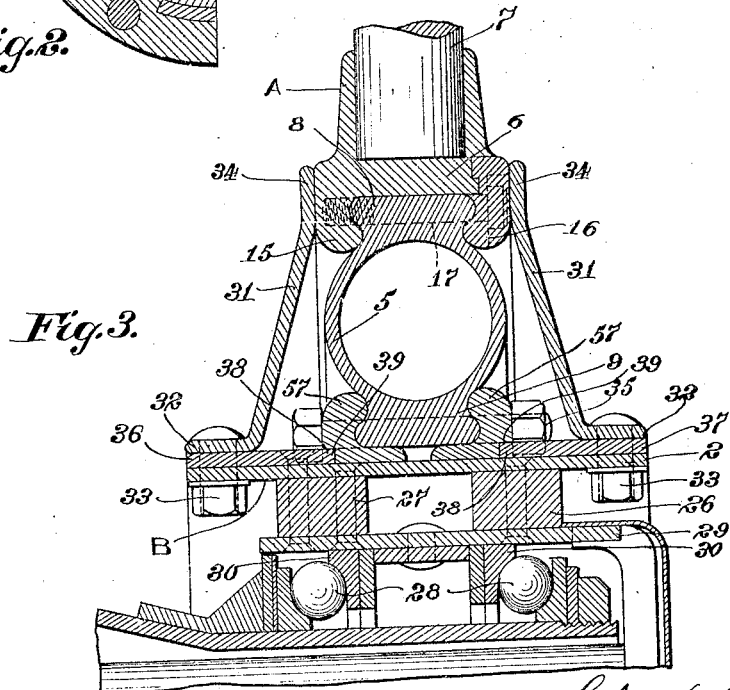

SCHUYLER C. HATFIELD, OF BALTIMORE, MARYLAND.

ELASTIC WHEEL.

1,410,300. Specification of Letters Patent. Patented Mar. 21, 1922.

Application filed February 8, 1917. Serial No. 147,373.

*To all whom it may concern:*

Be it known that I, SCHUYLER C. HATFIELD, a citizen of the United States of America, residing in the city of Baltimore, State of Maryland, have invented certain new and useful Improvements in Elastic Wheels, of which the following is a specification.

The present invention relates to an elastic wheel of the general type of that described in my United States Patent No. 1,105,654. Such a wheel consists of an outer section and an inner or hub section, the outer section having an outer rim corresponding to the rim of the ordinary wheel, spokes, and an inner rim to which the inner ends of the spokes are attached. Between the outer and inner sections is a pneumatic tire or annular pad or a plurality of pads with means for holding and engaging the pad, and the hub section has removable radial flanges or annular plates to engage the outer section permitting it to move relatively to the hub section in a radial plane but arresting any tendency to motion in the direction of the axis. This application describes and claims the features of a new form of wheel of this type.

In the sale of elastic wheels it will be necessary to equip vehicles already supplied with wheels. Even in wheels of a uniform diameter there will be a considerable variation in the diameter of the shaft or spindle and hence of the bearing and more particularly of the moving or rotary portion of the bearing. It is important to the end that any mechanical device be manufactured with a fair degree of economy, that the majority of the parts shall be interchangeable and one feature of the present invention relates to a construction where this is made possible. In order to bring about this condition the hub section is made to include a cylinder or ring larger than any of the bearings to which the wheel will be applied. This is to be made of uniform or standard size in all the wheels manufactured. To this cylinder the seating rings for the tire or pad are secured, the side plates which position the parts are also secured to this cylinder and it is provided with one or more internal spacing rings of considerable thickness which are secured to the cylinder. These may be turned out internally to fit the bearing of the particular wheel for which the elastic wheel is being substituted. If necessary the outer or rotary portion of the bearing may be removed and a new piece adapted to cooperate with the hub ring supplemented. Thus, it is only necessary to vary the thickness of the spacing rings or, at most, to supply as a part which cannot be standardized a new cylinder or ring to carry the outer cups of the bearing.

Another feature of the invention relates to the annular plates by which the two sections of the wheel are held in their sliding relation and axial motion of one relatively to the other prevented, and particularly to the placing of the bolts by which these plates are secured. As these plates are annular in shape and the principal stress which they have to resist is in the direction of the axis, the tendency is, if the bolts are placed parallel to the axis, to strip the threads and loosen the bolts by pulling off the nuts. However, they have in the past been placed parallel to the axis. In accordance with the present invention the annular plates are provided with a cylindrical flange concentric with the axis of the wheel and the bolts are passed radially through this flange and through the standard cylinder referred to near the ends.

In the accompanying drawing I have illustrated an elastic wheel to which the features of my invention are applied.

Figure 1 is a fragmentary section taken on the plane of the diameter illustrating the invention applied to an elastic wheel having two pneumatic pads side by side.

Figure 2 is a section of the same on the line 2, 2 of Figure 1.

Figure 3 is a fragmentary diametrical section of a modified form having a single pad or tire.

Figure 4 is a fragmentary side elevation with the plate removed.

Referring to the drawings by numerals each of which is used to indicate the same or similar parts in the different figures; the structures shown include an outer wheel section A, a hub section B, and pneumatic pads 3, 4 in Figure 1 and 5 in Figure 3, between the sections.

Of the outer section of the wheel I have illustrated the inner rim 6 shown in cross-section in Figures 1 and 3 and the inner portion of one of the spokes 7. The hub includes a cylinder 2, of standard size enclosing the bearing, etc. Each of the pads, 3, 4 and 5 as shown is provided with an outer tire bead 8 on its outer circumference, and an inner tire bead 9 on its inner circumference. The outer beads 8 are secured to the outer section or more properly to the inner rim and the inner beads 9 to the hub by any suitable means. The form illustrated will be described.

Referring particularly to the structure shown in Figure 1, the inner rim 6 is provided with a removable bead 10 at the left, a stationary double bead 11, at the center and a removable bead 12 at the right. These beads preferably have a rabbeted or tongue and groove connection 13, with the inner rim 6 to take up the radial stress applied to the bead both toward and from the center of the wheel by means of the pads. The beads 8 of the pads are compressed one between each of the respective removable beads 10 and 12 and the central bead 11, by means of bolts 14 placed parallel to the axis at suitable intervals along the inner rim 6 and passing through the removable beads 10, 12, the central bead 11 and the beads 8 on the tires or pneumatic pads. These bolts serve to draw the removable beads inward and grip the tire beads so that they are held firmly against all tendency to displacement including tension applied to the pads by the weight of the vehicle when the pads are deflated.

In the single pad structure shown in Figure 3, the pad is secured to the inner rim 6 by means of an integral bead 15 on the rim on one side, i. e. the left, and a removable bead 16 on the right similar to the beads 10 and 12 in Figure 1, held in position by means of bolts 17 parallel to the axis of the wheel and shown as threaded at their ends into the integral bead 15.

Referring to the form of the invention shown in Figure 1, the inner tire beads 9 are secured to the hub, or more properly, the standard cylinder 2, by means of end hub beads or bead rings 18 and 19 and center hub bead 20. The center hub bead 20 is secured to the pad ring 21 which encircles and fits the cylinder 2 and the end beads 18 and 19 have a toothed or dove-tailed engagement 20' with the ring 21. To this they are secured by means of bolts 22 placed parallel to the axis passing through all three of the hub beads 18, 19 and 20 and also through the inner tire beads 9. To prevent rotation of the bead 18 on the hub, the bead ring 18 is also notched at 23 to admit the ends of the fixed radial pins 24.

In addition to the pins 24, I have provided as means for preventing rotation of the ring 21 and the beads 18, 19 and 20 relatively to the sleeve 2, tapered radial pins 50 seated in suitable sockets 51 in the hub and engaging notches 52 in the rings 19. To prevent displacement of the pins, I provide a ring 53 to be slipped on over the end of the sleeve 2 and the ring 53 carries a circular pin 54 which covers the ends of the pins 50. In order that the pins may be conveniently withdrawn, I have shown them as having a circular groove 55 near the head in which a screw-driver or other instrument may be inserted to pry them out of their sockets.

The cylinder or sleeve 2 is, as has already been stated, of uniform or standard diameter, filling or spacing rings 27, of thick, preferably cast metal, being supplied to support this cylinder or sleeve on the bearing and to this end rings 26 and 27 may be turned from within or otherwise provided of any desired thickness. These rings are secured to the sleeve in any suitable manner as by rivets.

In Figure 3 I have shown in connection with the hub a ball-bearing 28 with an outer cylinder or sleeve 29 carrying the outer ball races 30. The rings 26 and 27 and the sleeve 2 are secured to the sleeve or cylinder 29 and the parts rotate as one.

Both structures show the hub and outer sections held in position as to their alignment by means of annular plates 31 secured to the hub at their inner periphery and bearing with their circumference on the inner rim of the outer section so that the latter can move relatively to the hub only in a radial direction. The annular plates 31 are provided at their inner edge with a cylindrical flange 32 encircling the central aperture. This flange is secured, in the case of each respective plate 31, to the corresponding edge portion of the sleeve or cylinder 2 by means of radial bolts 33 passing through registering apertures in the flange 32 and in the cylinder near its corresponding outer edge. In the preferred form of the invention, the plates 31 are inclined as a section of a cone the base of which rests on the inner rim 6, the portion 34, adjacent the circumference, being flat forming a bearing surface to engage the flat surface of the inner rim of the outer section.

The form of the invention shown in Figure 3 differs from that shown in Figure 1 as to the fastening means by which the inner tire bead 9 is secured to the standard cylinder 2. In Figure 3 such means consists of two notched beads 57 engaging each side of the tire bead 9 and drawn together by means of bolts 35 parallel to the axis passing through the two beads 57 and the tire bead 9. These are positioned by means of two rings or circular plates 36 and 37 taking over the sleeve 2 and notched at 38 to engage the notches 39 in the beads as are the rings 18 and 19 and the cylinder or ring 21. These plates 36 and 37 are secured to the cylinder 2 by means of the radial bolts 33, the plates being provided with apertures registering with those in the plates 31 and in the cylinder 2 through which the bolts pass.

In operation it will be noted that the principal stresses applied to the plates 31, which, it must be recollected, are annular or circular, are in the direction of the axis so that the stresses on the bolts 33 are transverse or shearing stresses and there is no tendency to strip the threads so that the bolts offer considerably more resistance than when placed parallel to the axis. Also the inclined plates 31 give the effect of an arch so that plates of a given weight offer considerably more resistance to any tendency to distort them than would be presented if they were of the same weight and flat or substantially flat.

To get at the tires or pneumatic pads in the single tire bead it is only necessary to take out the bolts 33 on one side when the plate 31 is released, the tire immediately becomes accessible and if it is desired to remove it the bolts 17 may be withdrawn and the nuts taken off of the bolts 35 when the outer beads 16 and 34 are freed, releasing the tire.

In the case of the double pad wheel shown in Figure 1, access may be had to the outer pad on the right in an obvious manner by removing the plate 31 as in Figure 3. To remove the left hand or inner pad 3, the bolts 33 on one side are withdrawn and the outer section of the wheel with the two pads and the ring 21 with the beads 18, 19 and 20 may be removed by sliding the ring 21 over the sleeve 2, or, if the pads be deflated, they may be released from the outer rim by loosening the bolts 14 and the plates 31, the two pads being freed from the outer section may be removed by sliding the ring 21 over the sleeve 2. Both pads are thus made conveniently accessible under any and all circumstances whereby the use of a plurality of pads in an elastic wheel as described is rendered wholly practical.

The function and operation of the filler rings 26 and 27 in connection with the standard size cylinder 2 whereby the cylinder is supported on any bearing which may be encountered, the rings being fitted internally to the outer sleeve of the bearing, it is believed, has been fully explained.

I have thus described an elastic wheel embodying my invention specifically and in detail in order that its nature and operation may be clearly understood; however, the specific terms herein are used descriptively rather than in their limiting sense and the scope of the invention is defined in the claims:

1. In an elastic wheel, an outer section having an inner rim, an inner or hub section having a cylindrical flange, a pneumatic pad between the sections, means for guiding the sections to permit relative motion in radial directions only, in the form of two plates, one at each side of the wheel, each having a circular inwardly disposed, radially flat guiding surface at the periphery engaging the corresponding surface of the inner rim, and a central aperture surrounded by a cylindrical flange overlying the hub flange with radial bolts applying a radial tension to said flange and passing through the hub flange and the guide flange securing each said flange to the hub section.

2. In an elastic wheel, an outer section having an inner rim, an inner or hub section having a cylindrical flange, a pneumatic pad between the sections, means for guiding the sections to permit relative motion in radial directions only, in the form of two frusto-conical plates, one at each side of the wheel, each having a circular inwardly disposed, radially flat guiding surface at the periphery engaging the corresponding surface of the inner rim, and a central aperture surrounded by a cylindrical guide flange overlying the hub flange with radial bolts supplying radial tension to said guide flange and securing each said flange to the flange on the hub section.

Signed by me at Baltimore, Maryland, this 31st day of January, 1917.

SCHUYLER C. HATFIELD.

Witnesses:
ZELLA KUHN,
ALICE G. DONEGAN.